Levi Scofield.

Seed Tube for Corn Planter.

116998  
PATENTED JUL 11 1871

116,998

UNITED STATES PATENT OFFICE.

LEVI SCOFIELD, OF WATERTOWN, WISCONSIN.

IMPROVEMENT IN SEED-TUBES FOR CORN-PLANTERS.

Specification forming part of Letters Patent No. 116,998, dated July 11, 1871.

*To all whom it may concern:*

Be it known that I, LEVI SCOFIELD, of Watertown, Jefferson county, State of Wisconsin, have invented an Improvement in Seed-Tubes for Corn-Planters; and I do hereby declare the following to be a full, clear, and exact description of the same, reference being had to the accompanying drawing forming part of this specification, in which—

Figure 1:
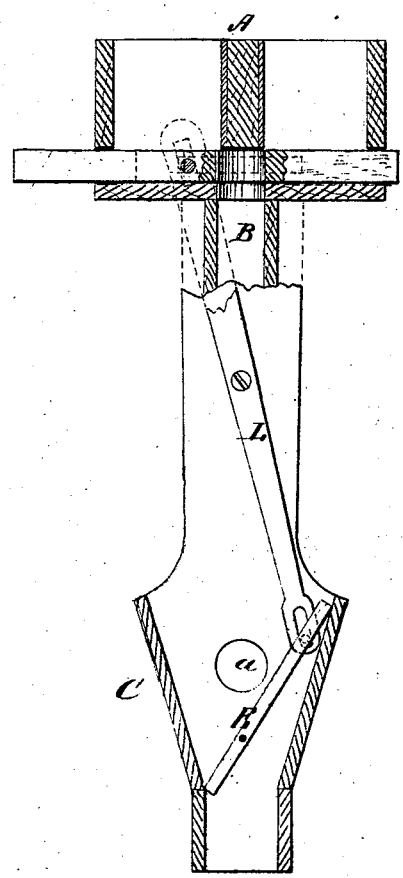
Figure 2:
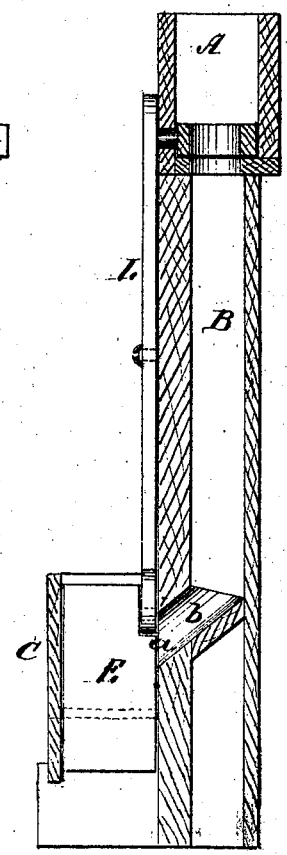

Figure 1 is a rear elevation, showing the upper and lower portions in section; and Fig. 2 is a vertical section.

Similar letters of reference in the accompanying drawing indicate corresponding parts.

The nature of my invention consists in so constructing the tube and its attachments that the quantity of seed taken from the seed-box for each hill shall be dropped into an open receptacle and there held in full sight of the attendant until it is deposited in the ground.

In the drawing, A is a seed-box, constructed so as to separate from the mass of seed in the box a quantity suitable for each hill of corn and drop that by itself into the seed-tube B. The details of construction of the seed-box and seed-tube are not material, although the common construction shown in the drawing, and which hardly needs further description, is, perhaps, as good as any. At or near the lower end of the seed-tube I place an incline, *b*, at the lower end of which is an opening, *a*. Through the wall of the seed-tube, (preferably the rear wall,) a box, C, open at the top, is so arranged with relation to the tube and its opening *a* as to receive all the seed that falls from the seed-box into the tube. This box may be attached to the tube, as shown in the drawing, or supported independently of it, as preferred. The form of the box is not material, except that it should have no cover, or, at any rate, a cover of wire or screen, or some transparent substance, so as to reveal the interior of the box without obstruction while at work in the field. The V-shape shown in the drawing is, perhaps, the best form, as it enables the attendant to see down into the box with the least trouble and from different positions. The bottom of the box is a valve, of any suitable construction, operated automatically from the slide of the seed-box or otherwise in such a manner as to hold in full view the corn received from the seed-box for each hill, drop it upon the ground, and instantly take position to receive a fresh quantity of seed for the next hill. The simplest and best construction to effect this object is believed to be the device shown in the drawing, consisting of a pivoted bottom or valve, E, operated from the slide of the seed-box by means of a lever, L, outside of the tube, so as not to obstruct the seed, and connected to the valve and the slide by a slot and pin at each of its extremities. As the slide works back and forth in the seed-box, discharging the seed for a single hill at each movement, the top of the valve E, Fig. 1, is alternately thrown to the right or left so as to completely close the bottom of the box C, forming a V-shaped receptacle in it, first on one side and then on the other. The top of the receptacle thus formed coincides in width with the top of the box, so that the seed freely enters, and everything in it can at all times be plainly seen. The seed that enters the receptacle, instead of lying scattered about on a flat bottom, is collected in a mass at the lower angle of the chamber, where it is more conspicuous, and, at the same time, is in a better position for dropping properly upon the hill, and as the valve is actually inverted at each movement, every kernel must be discharged, there being no possible opportunity for any to remain in or adhere to the box, or to be crushed or otherwise injured during the operation. It will be observed that the short oscillating valve E, connected by an oscillating lever to the slide of the seed-box or other motive apparatus, is altogether different from the long oscillating valve arranged in the seed-tube and operated directly from the slide, and this difference is a matter of great practical importance, producing the following results: 1st, the valve moves more quickly, intercepting all the seed belonging to each hill and thus causing the machine to drop the seed uniformly and without scattering. 2d, widening the top of the seed receptacle so as to expose it better to view. 3d, dispensing with the long upper extremity of the valve and reducing the whole to the limits of the small receptacle, so that a spectator standing on either side thereof can readily look over the upper end of the valve into the receptacle and see the contents thereof. 4th, flattening the bottom of the receptacle so as to hold the seed therein plainly up to view, yet without scattering it. 5th, enabling the tube itself to be kept entirely clear of obstructions. 6th, enabling the seed receptacle to be arranged in rear of the seed-box, and not under it, as heretofore, so that the seed-box will not obstruct the view of its contents; and 7th, rendering the apparatus cheaper and easier to construct and repair.

Having thus described my invention, what I claim as new therein, and desire to secure by Letters Patent, is—

1. A seed-tube for corn-planters, through which the seed from the hopper drops without obstruction into an open receptacle at the back of said tube upon the upper surface of a valve hung in said receptacle, and operated by an independent oscillating lever pivoted to the back of the seed-tube so as to leave the whole upper surface of the valve exposed to view from each side, substantially as herein described, for the purpose specified.

2. The V-shaped box C, in combination with the oscillating valve and lever, all arranged outside of the seed-tube, substantially as described.

LEVI SCOFIELD.

Witnesses:
C. B. SKINNER,
EDWARD FOLEY.